United States Patent
Xu et al.

(10) Patent No.: US 8,493,044 B2
(45) Date of Patent: Jul. 23, 2013

(54) MULTI-PHASE DC-TO-DC CONVERTER WITH DAISY CHAINED PULSE WIDTH MODULATION GENERATORS

(75) Inventors: Peng Xu, San Jose, CA (US); Jian Jiang, Hangzhou (CN); Jinghai Zhou, San Jose, CA (US)

(73) Assignee: Monlithic Power Systems, Inc., San Jose, CA (US)

( * ) Notice: Subject to any disclaimer, the term of this patent is extended or adjusted under 35 U.S.C. 154(b) by 373 days.

(21) Appl. No.: 12/849,316

(22) Filed: Aug. 3, 2010

(65) Prior Publication Data
US 2011/0025284 A1 Feb. 3, 2011

Related U.S. Application Data

(60) Provisional application No. 61/230,948, filed on Aug. 3, 2009.

(51) Int. Cl.
  *G05F 1/00* (2006.01)
(52) U.S. Cl.
  USPC ........................................... 323/282; 323/271

(58) Field of Classification Search
  USPC .......................................... 323/271, 282, 283
  See application file for complete search history.

(56) References Cited

U.S. PATENT DOCUMENTS

| | | | |
|---|---|---|---|
| 6,281,732 B1 * | 8/2001 | Mirow | 327/227 |
| 6,495,995 B2 * | 12/2002 | Groom et al. | 323/283 |
| 6,919,750 B2 * | 7/2005 | Kawahito et al. | 327/295 |
| 2006/0158802 A1 * | 7/2006 | Kawashimo et al. | 361/56 |
| 2007/0291520 A1 * | 12/2007 | Schuellein | 363/65 |
| 2008/0042634 A1 * | 2/2008 | Harrison et al. | 323/288 |
| 2008/0303495 A1 * | 12/2008 | Wei et al. | 323/272 |
| 2009/0140706 A1 * | 6/2009 | Taufik et al. | 323/272 |
| 2010/0259237 A1 * | 10/2010 | Wang | 323/282 |

* cited by examiner

*Primary Examiner* — Adolf Berhane
*Assistant Examiner* — Emily Pham
(74) *Attorney, Agent, or Firm* — Perkins Coie LLP

(57) ABSTRACT

A multi-phase DC-DC converter is disclosed. The DC-DC converter has a plurality of phases, each with a separate PWM generator for driving a totem pole of transistors. A master PWM generator operates off of a master clock signal. The remainder of the phases are slaved to the master PWM generator.

9 Claims, 5 Drawing Sheets

US 8,493,044 B2

MULTI-PHASE DC-TO-DC CONVERTER WITH DAISY CHAINED PULSE WIDTH MODULATION GENERATORS

CROSS REFERENCE TO RELATED APPLICATIONS

This application claims priority to and the benefit of U.S. Provisional Patent Application No. 61/230,948, filed Aug. 3, 2009 and titled MASTER-SLAVE CIRCUIT FOR CORE VOLTAGE REGULATION, which is incorporated herein by reference in its entirety.

TECHNICAL FIELD

The present invention relates to DC-to-DC power converters, and more particularly, for a multi-phase DC-to-DC converter.

BACKGROUND

DC-DC converters are used in a wide variety of electronic devices, particularly battery operated mobile devices. The DC-DC converters need to be able to provide a stable power supply to electronic components at a preset and stable voltage.

A multiphase DC-DC converter operates by having stages connected in parallel, but offset in phase. Current multiphase DC-DC converters have various drawbacks, such as inefficiency in power conversion, difficulty in integration into integrated circuits, and cost.

DETAILED DESCRIPTION

In the description that follows, the scope of the term "some embodiments" is not to be so limited as to mean more than one embodiment, but rather, the scope may include one embodiment, more than one embodiment, or perhaps all embodiments.

Figure 1:
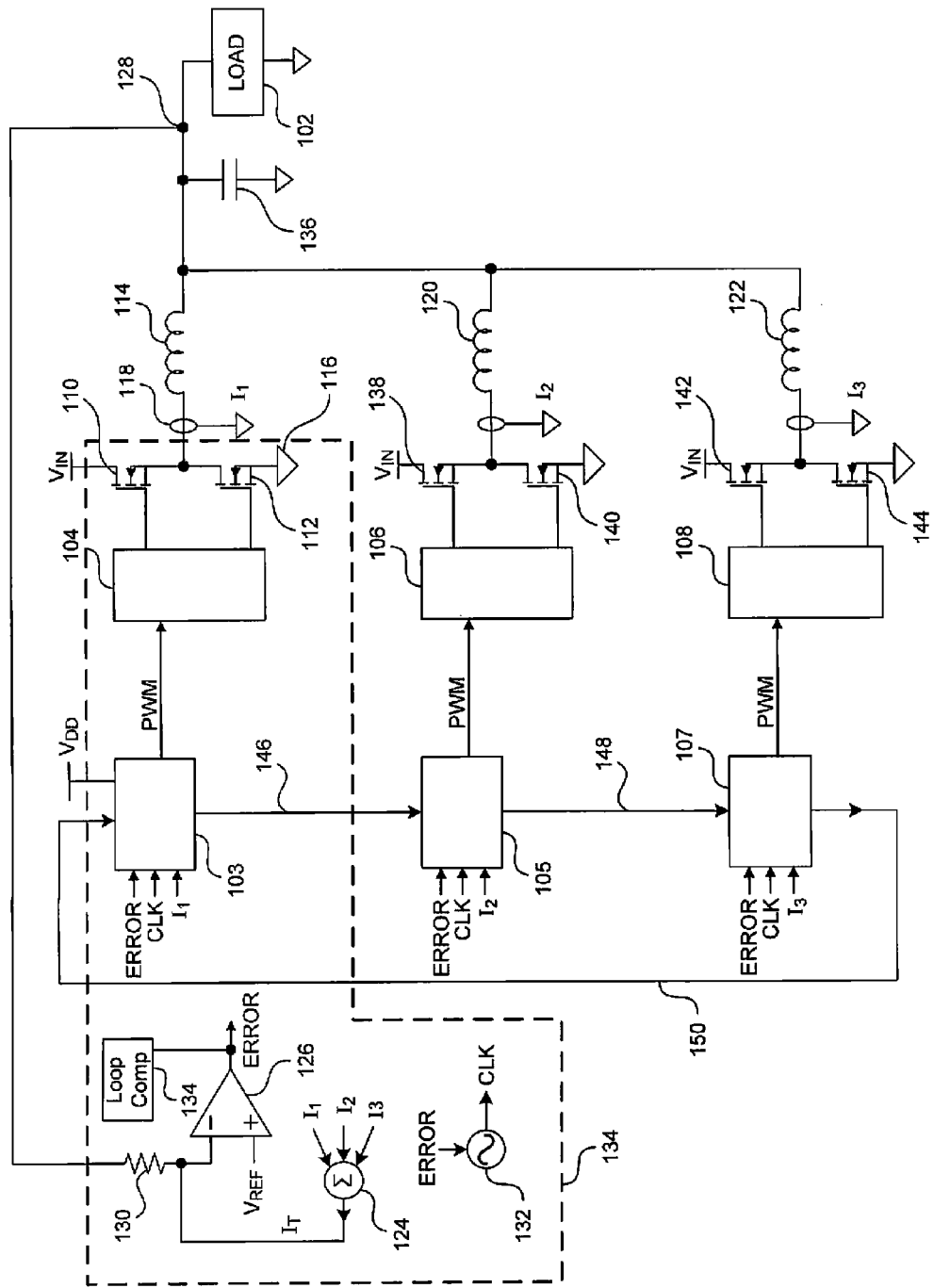
FIG. 1 illustrates a DC-to-DC converter of one disclosed embodiment.

FIG. 1 illustrates an architecture for a multi-phase DC-to-DC converter. The illustration of FIG. 1 comprises a mixture of circuit elements and functional units. The DC-to-DC converter provides power to load 102 at a regulated voltage, where the power is provided by a power supply having a voltage $V_{IN}$. Load 102 in one embodiment may be a central processing unit, but any other type of electronic circuitry may be powered by the converter.

In multiphase DC-to-DC converters, a set of pulse width modulated signals, denoted as "PWM" in FIG. 1, is generated to switch on and off power transistors, where each PWM signal switches on and off a high-side power transistor and a low-side power transistor. The particular embodiment of FIG. 1 illustrates a three-phase DC-to-DC converter, where three pulse width modulated signals are generated: a first pulse width modulated signal generated by PWM generator 103 and provided to driver 104, a second pulse width modulated signal generated by PWM generator 105 and provided to driver 106, and a third pulse width modulated signal generated by PWM generator 107 and provided to driver 108. Embodiments are not limited to three phase DC-to-DC converters, and as will be described later, embodiments allow scalability so that any practical number of desired phases may be realized.

Driver 104 drives the gates of the high-side power nMOSFET 110 and low-side power nMOSFET 112 to either connect inductor 114 to the power supply voltage $V_{IN}$ or to ground 116. Similar remarks apply to drivers 106 and 108 and their corresponding nMOSFETs and inductors. In practice, each power nMOSFET is realized by a large number of nMOSFETs in parallel. Embodiments are not limited to power nMOSFETs, so that other types of switching elements may be used.

For each driver, a current sense element is used to provide a signal indicative of the current provided to its corresponding inductor. For example, current sense element 118 provides a signal, denoted by $I_1$ in FIG. 1, indicative of the current flowing through inductor 114. A current sense element may comprise more than one circuit element, and need not be directly connected to its corresponding inductor. Similarly, the signal $iL_2$ is indicative of the current flowing through inductor 120, and the signal $iL_3$ is indicative of the current flowing through inductor 122. These signals, $I_1$, $I_2$, and $I_3$ for the particular embodiment of FIG. 1, will be referred to as current sense signals.

Sometimes a current sense signal may be represented by a voltage, and sometimes by a current, but for ease of notation, the same symbol will be used to represent either a voltage or current. It should be clear from context which is meant. Furthermore, an embodiment may include circuit components for converting a current sense signal from a voltage to a current, or from a current to a voltage, so that within the same embodiment, both voltages and currents may be used to represent a current sense signal.

Each current sense signal is provided to its corresponding PWM generator. For example, PWM generator 103 has an input port $I_1$ for receiving the current sense signal $I_1$. The current sense signals are summed by summer 124 to provide a signal $I_T$ indicative of the total current, which is provided to the negative input port of operational amplifier (OPAMP) 126. A feedback signal path is provided from node 128, through resistor 130 to the negative input port of OPAMP 126. A reference voltage REFIN is provided to the positive input port of OPAMP 126. The output signal of OPAMP 126 may be termed an error signal, and is denoted as "ERROR" in FIG. 1. The error signal is provided to an input port of each PWM generator. A loop compensation filter may be applied to the output signal of OPAMP 126. Accordingly, functional unit 134 represents a loop compensation filter, so that the error signal may be assumed to have been filtered by loop compensation functional unit 134.

Each PWM generator uses the error signal to adjust the duty cycle of the PWM signal provided to its corresponding driver. Such negative feedback loops are known in the art of DC-to-DC converters, and need not be described in detail. Accordingly, an embodiment may utilize any technique for adjusting the PWM signals to minimize the amplitude of the error signal.

Figure 5:
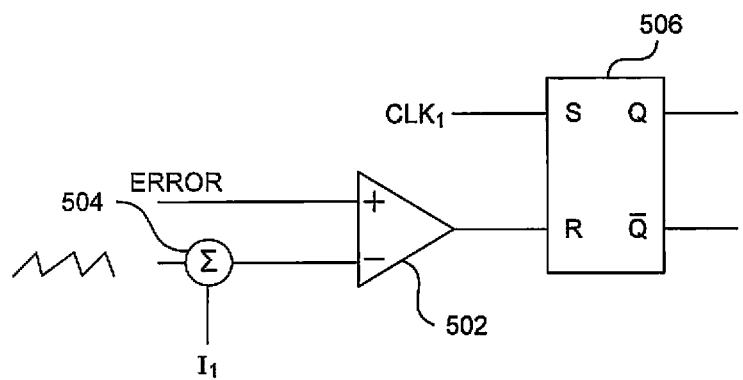
FIG. 5 illustrates a pulse width modulation generator for a DC-to-DC converter.

One embodiment for PWM generator 103 is illustrated in FIG. 5. The error signal is provided to the positive input port of OPAMP 502. Summer 504 sums a sawtooth waveform with the current sense signal $I_1$, and provides the resulting sum to the negative input port of OPAMP 502. The sawtooth waveform and current sense signal may both be voltages, in which case the sum of the voltages is provided to OPAMP 502. If the current sense signal is a current, then for some embodiments, a transresistance amplifier may be used to provide summer 504 a voltage indicative of the current sense signal.

The output of OPAMP 502 is provided to the R input port of SR latch 506. Each PWM generator samples the master clock signal CLK to provide its own internal clock signal, which for the particular embodiment of PWM generator 103 in FIG. 5 is represented by $CLK_1$. This sampling will be described in more detail later. The internal clock signal is provided to the S input port of SR latch 506. The Q output port of SR latch 506 provides the PWM signal to driver 104. In this way, the PWM signal is adjusted to reduce the amplitude of the error signal provided to OPAMP 502. Because the current sense signal $I_1$ is added to the sawtooth waveform, when load 102 suddenly draws a large amount of current, the PWM signal is adjusted to provide a higher duty cycle to high-side nMOSFET 110, so as to help regulate the load voltage.

Some prior DC-to-DC converters may be susceptible to voltage droop, whereby the regulated voltage provided to a load may droop if the load suddenly draws more current. In accordance with embodiments described herein, the droop is mitigated by employing the feedback path comprising resistor 130 and the total current signal $I_T$. For the particular embodiment of FIG. 1, the total current signal $I_T$ is a current, so that if the resistance of resistor 130 is denoted by R and the load voltage at node 128 is denoted as $V_L$, then the voltage provided to the negative input port of OPAMP 126 is $V_L+R \times I_T$. The error signal provided by amplifier 126 is given approximately by $K \times (V_{REF}-V_L-R \times I_T)$, where K is the amplifier gain.

When there is a sudden increase in the total current delivered to load 102, which for example may happen frequently for a central processing unit, there is a corresponding sudden increase in the amplitude of the error signal. Consequently, the PWM generators quickly adjust their PWM signals accordingly to bring the load voltage back up to the desired level to help mitigate the voltage droop.

Figure 2:
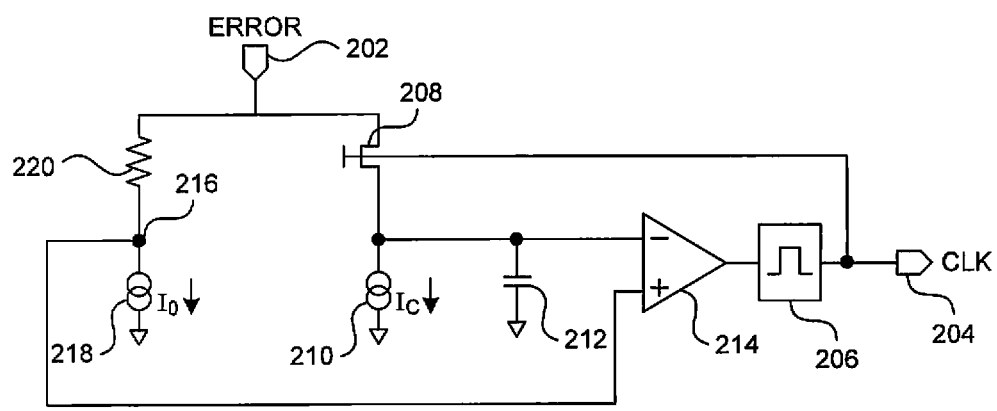
FIG. 2 illustrates a clock generator with an adaptive frequency for a DC-to-DC converter.

Referring to FIG. 1, clock generator 132 generates a master clock signal that is provided to all of the PWM generators. The master clock signal is denoted as "CLK" in FIG. 1. Clock generator 132 uses the error signal to adaptively adjust the instantaneous frequency of the master clock signal, where the frequency of the master clock signal is increased during transients. FIG. 2 illustrates a more detailed description of an embodiment clock generator.

The error signal is provided at input port 202, and the master clock signal is provided at output port 204, which is also the output port of one-shot 206. So as not to load the output of one shot 206, buffers may be used to provide the master clock signal, but for ease of illustration such buffers are not explicitly shown in the illustration of FIG. 2. Current source 210 sources a current, denoted as $I_C$, to charge capacitor 212 when nMOSFET 208 is off. OPAMP 214 compares the voltage drop across capacitor 212 to the voltage developed at node 216. With current source 218 sourcing a current, denoted by $I_0$, at node 216, the voltage at node 216 is given by $V_{ERR}-I_0 \times R_0$, where $V_{ERR}$ denotes the voltage of the error signal, and $R_0$ denotes the resistance of resistor 220.

The instantaneous frequency (or period) of the master clock signal provided at output port 204 depends upon the rate at which capacitor 212 is charged, as well as the value of the voltage developed at node 212 by choosing the current source 218 and resistor 220. The voltage on capacitor 212 is discharged by current source 210 when nMOSFET 208 is off. The period of the master clock signal is the time duration for charging capacitor 212 to the voltage at node 216, $V_{ERR}-I_0 \times R_0$. Once the voltage on capacitor 212 is pulled below the voltage at node 216, OPAMP 214 causes one-shot 206 to provide a pulse, which serves as a clock tick and also turns on nMOSFET 208 for a short duration to discharge capacitor 212.

The period or frequency of the master clock signal may be adjusted by choosing values of the currents sourced by current sources 218 and 210, the value of the resistance of resistor 220, the capacitance of capacitor 212, or some combination thereof. If these parameters are fixed, then the period of the master clock signal is constant provided that the voltage of the error signal is constant.

The voltage at node 216 tracks the voltage of the error signal. If there is a sudden increase in the error signal voltage, then less time is needed to charge capacitor 212 to cause OPAMP 214 to trip one-shot 206. Thus, the instantaneous period of the master clock signal is shortened to help with transients in the load voltage.

Each PWM generator includes a decoder circuit to determine which phase of the master clock signal to use. The particular phase chosen by any one PWM generator depends upon how many PWM generators are used in the DC-to-DC converter. For example, the particular embodiment illustrated in FIG. 1 is configured as a three-phase DC-to-DC converter, so that each PWM generator derives its internal clock signal from the master clock signal CLK by sampling the master clock signal at every third pulse. If for example only one PWM generator is used in a particular embodiment, then that PWM generator would sample the master clock signal at every pulse. Embodiments allow any practical number of PWM generators to be connected to one another.

The system components within the dashed line 134 are integrated on a single die (chip). Current sensing element 118 may be integrated on the same die as the components within dashed line 134. However, some circuit elements associated with the system components within dashed line 134 may be discrete and not integrated on the die. For example, capacitor 212 or resistor 220 in the clock generator circuit illustrated in FIG. 2 may be discrete components not integrated with the other components within dashed line 134. The other system components, except the inductors, capacitor 136, and load 102, may be integrated on one or more dice separate from the die represented by dashed line 134. For some embodiments, each PWM generator and its associated driver and power MOSFETs are integrated on a separate die. For example, PWM generator 105, driver 106, and power MOSFETs 138 and 140, may be integrated on a second die; and PWM generator 107, driver 108, and power MOSFETs 142 and 144, may be integrated on a third die.

The dice containing PWM generator 105 and PWM generator 107 need not necessarily include copies of the control system components illustrated within dashed line 134. PWM generator 103 may be termed a master PWM generator, and the other PWM generators may be termed slave PWM generators.

In some embodiments, each die containing a PWM generator may also contain a copy of the control system components illustrated within dashed line 134, regardless of whether such system components are used or not. A chip containing a control system may be configured as a slave chip, where its control system is unused. In this paradigm, the packaged integrated circuits available to the system designer are identical, except one is configured as a master chip, and the others as slave chips.

The PWM generators are connected into a daisy chain. For example, PWM generator 103 is connected to PWM generator 105 by interconnect 146, and PWM generator 105 is connected to PWM generator 107 by interconnect 148. In the particular embodiment of FIG. 1, there is also interconnect 150 connecting the last PWM generator (107) to the master PWM generator (103). Some embodiments may not need the interconnect from the last slave PWM generator to the master PWM generator.

Figure 3:
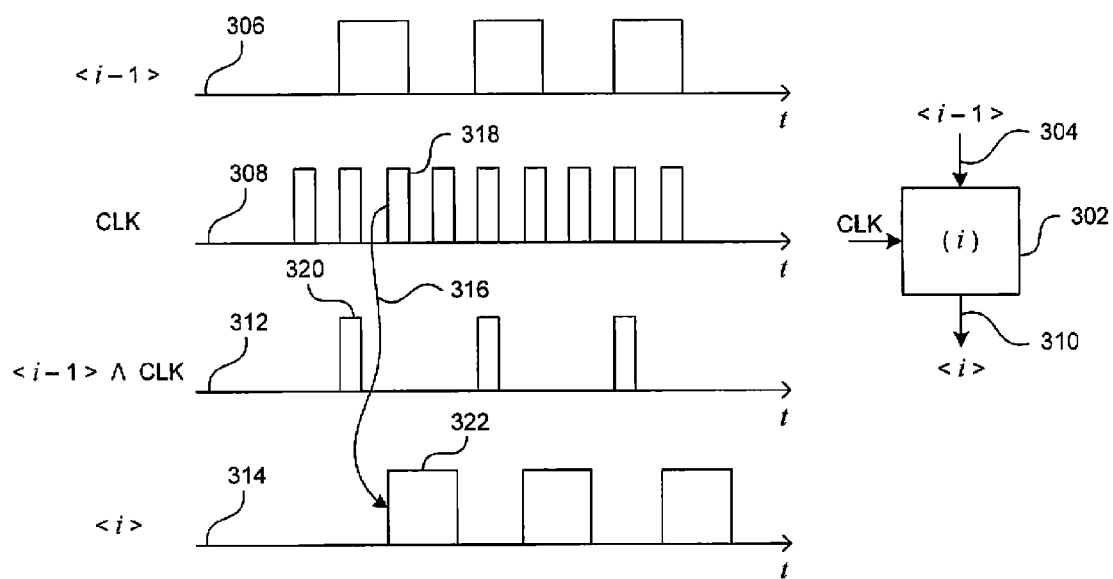
FIGS. 3 and 4 illustrate a pulse width modulation generator for a DC-to-DC converter.

FIG. 3 illustrates an embodiment for a PWM generator to determine the phase at which to sample the master clock signal. Functional unit 302 denotes a PWM generator, where the notation (i) within the box representing the PWM generator indexes the particular PWM generator, where in the particular embodiment of FIG. 3, i=0, 1, 2. For example, i=0 may denote PWM generator 103, i=1 may denote PWM generator 105, and i=2 may denote PWM generator 107. The signal <i−1> at input port 304 to PWM generator 302 indicates an output signal provided by the PWM generator having index (i−1) modulo 3, where the positive remainder is taken when performing the modulo operation. For example, if i=0, then (i−1) modulo 3=2, which denotes PWM generator 107. This signal is used by a PWM generator to determine which clock phase to sample, and for convenience the signal <i> for any value of the index i will be referred to as a phase decode signal.

An example of the <i−1> phase decode signal is illustrated in the plot in FIG. 3 with time axis labeled 306. Plot 306 shows three pulses of the <i−1> signal. For reference, below plot 306 is a plot illustrating the master clock signal, with time axis labeled 308, showing nine pulses of the master clock signal. In the particular example of FIG. 3, the period of the <i−1> phase decode signal is three times as large as the period of the master clock signal, where each pulse in the phase decode signal has a width in the time domain equal to the period of the master clock signal. However, it is to be noted that a master clock signal may not have a well-defined period because its instantaneous frequency (or period) may vary with time, and for some embodiments, the width of the phase decode signal pulses in the time domain need not be equal to the instantaneous period of the master clock signal. For some embodiments, the time domain width of the phase decode signal pulses may be less than the instantaneous period of the master clock signal, and a phase decode signal may not have a well-defined because its instantaneous frequency may also vary in time along with the master clock signal.

PWM generator 302 samples the master clock signal by performing the Boolean AND expression <i−1> ∧ CLK, or its logical equivalent. This effectively samples the CLK signal at every third pulse coinciding with the beginning of a pulse in the <i−1> phase decode signal. A plot of <i−1> ∧ CLK is illustrated in FIG. 3 with time axis labeled 312, showing three pulses.

PWM generator 302 provides at output port 310 the <i> phase decode signal for the next PWM generator in the daisy chain. Three pulses of this phase decode signal are illustrated in the plot having time axis 314. PWM generator 302 generates the <i> phase decode signal by generating a pulse having a width equal to one clock period, where the pulse begins at the master clock signal CLK pulse just following the sampled master clock signal pulse <i−1> ∧ CLK. Arrow 316 illustrates this relationship, where pulse 318 is the master clock signal pulse following the sampled master clock signal pulse 320. Pulse 322 then begins when pulse 318 begins.

The above discussion of the relative times among the pulses for the master clock signal, the sampled clock signal, and the signals <i−1> and <i> is idealized in that the pulses are represented by ideal rectangles, and time delays are ignored. A startup procedure should be implemented when the DC-to-DC converter is first turned on because the phase decode signal from the last PWM generator in the daisy chain is not available to the master PWM generator. As one example, the master PWM generator during startup may generate a first pulse for the phase decode signal <0> at the time that it samples the master clock signal even though no pulse is provided to its input port.

Effectively, except perhaps during startup and shutdown, the phase decode signal <i> comprises a sequence of pulses time shifted relative to the pulses in the phase decode signal <i−1>, where the time shift at any given time after startup and before shutdown is the instantaneous clock period at that given time. The master clock signal and the phase decode signals are synchronous. In FIG. 3, the pulses of the two illustrated phase decode signals are shown as beginning at the same time as a corresponding master clock signal pulse. In practice, there may be some degree of phase jitter or delay so that the phase decode signal pulses may not be exactly aligned with their corresponding master clock signal pulses. Accordingly, the phase decode pulses are substantially aligned with their corresponding master clock signals. For example, the pulses for the phase decode signal <i> start substantially at the beginning of a master clock pulse immediately following a pulse making up the sequence of pulses for the phase decode signal <i−1>. It is to be understood that "substantially" is a term of art, and is meant to convey the principle that relationships such simultaneity or perfect synchronization cannot be met with exactness, but only within the tolerances of the technology available to a practitioner of the art under discussion.

The above description may be easily generalized to where there are N slave PWM generators daisy chained with the master PWM generator, where N is an integer. The N+1 dice in the daisy chain may be represented by the set of dice {D(i), i=0, 1, 2, . . . , N}, where each die D(i) has an input port I(i) having the signal <i>, and an output port O(i). The input port I(i) is connected to the output port O((i−1)modulo N+1). The internal clock signal C(i) is logically equivalent to the Boolean AND of the master clock signal and the signal <i>. The phase decode signals satisfy the relationship where each pulse for the phase decode signal <i> begins at the master clock pulse immediately following a <(i−1)modulo N+1> pulse. However, this relationship for the phase decode signals is not necessarily satisfied during the initial startup of the daisy chain, as well as perhaps when the daisy chain is shut down.

Figure 4:
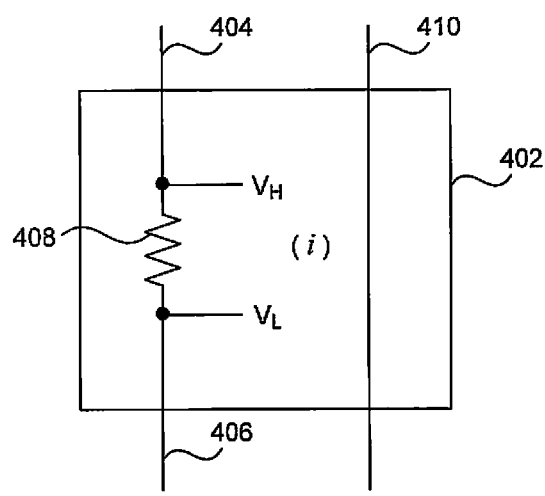

FIG. 4 illustrates another embodiment for a PWM generator to determine the phase at which to sample the master clock signal. PWM generator 402 includes a high-side port 404 and a low-side port 406. PWM generator 402 is associated with the index i. The high-side port 404 is connected to the low-side port of the (i−1) PWM generator, unless i=0, in which case PWM generator 402 is the master PWM generator and its high-side port is connected to the analog power supply, having the voltage $V_{DD}$. The low-side port 406 is connected to the high-side port of the (i+1) PWM generator, unless the PWM generator is the last in the daisy chain, in which case the low-side port 406 is connected to ground.

High-side port 404 is coupled to low-side port 406 by way of resistor 408, which may be an internal or external resistor. PWM generator 402 samples the voltages at high-side port 404 and low-side port 406, where these voltages are denoted, respectively, as $V_H$ and $V_L$. Assuming that the resistance of each resistor for each PWM generator is the same, it is easily seen that the index i is given by $$\frac{V_{DD} - V_H}{V_H - V_L} = i.$$

Because the analog voltage $V_{DD}$ is available to each PWM generator, each PWM generator may determine its relative position in the daisy chained PWM generators. The above expression may be evaluated by any one of a number of methods.

To synchronize all of the PWM generators, the master PWM generator also sends a signal on bus 410 when it first samples the master clock signal. In this way, each PWM generator may determine without ambiguity the time to the sample the master clock signal.

Embodiments need not have all of the components illustrated in the previous figures. For example, an embodiment may have the components for droop control illustrated in FIG. 1, e.g., the feedback path from node 128 to the negative input port of OPAMP 126, but not the other features. Or as another example, an embodiment may have the daisy chained PWM generators as described above, but not have the droop control or adaptive clock generator 132, but rather a fixed clock generator.

The use of a master PWM generator and slave PWM generators provides a scalable design methodology for building multi-phase DC-to-DC converters. A designer may choose any practical number of PWM generators as building blocks to realize any practical number of phases for a multi-phase DC-to-DC converter.

Features and aspects of various embodiments may be integrated into other embodiments, and embodiments illustrated in this document may be implemented without all of the features or aspects illustrated or described. One skilled in the art will appreciate that although specific examples and embodiments of the system and methods have been described for purposes of illustration, various modifications can be made without deviating from the spirit and scope of the present invention. Moreover, features of one embodiment may be incorporated into other embodiments, even where those features are not described together in a single embodiment within the present document. Accordingly, the invention is described by the appended claims.

We claim:

1. A circuit comprising:
a first node having an analog supply voltage;
a second node having a high-side voltage;
a third node having a low-side voltage;
a functional unit to sample a master clock signal having a sequence of pulses based on a phase of the master clock signal to provide an internal clock signal, wherein the phase is determined by the ratio of numerator and a denominator, wherein the numerator is the difference between the analog supply voltage and the high-side voltage, and the denominator is the difference between the high-side voltage and the low-side voltage;
a pulse width modulation generator to provide a pulse width modulation signal clocked by the internal clock signal; and
a high-side power transistor and a low-side power transistor coupled to the pulse width modulation generator to switch on and off in response to the pulse width modulation signal, so that the high-side power transistor is on only if the pulse width modulation signal is in a first logical state, and the low-side power transistor is on only if the pulse width modulation signal is in a second logical state complementary to the first logical state, such that both the high-side and low-side power transistors are not simultaneously on.

2. The circuit as set forth in claim 1, further comprising:
a master clock signal input port to receive the master clock signal.

3. The circuit as set forth in claim 1, further comprising:
a clock generator to provide the master clock signal.

4. The circuit as set forth in claim 1, wherein the high-side voltage is equal to the analog supply voltage.

5. The circuit as set forth in claim 1, further comprising:
a resistor having a first terminal connected to the second node, and having a second terminal connected to the third node.

6. A system comprising a set of dice $\{D(i), i=0, 1, 2, \ldots, N\}$, where N is an integer greater than 0,
the die D(0) comprising a clock generator to provide a master clock signal, and the die D(i) coupled to the clock generator to receive the master clock signal for each $i=1, 2, \ldots, N$;
the die D(i) comprising a node $n1(i)$ having an analog supply voltage, a node $n2(i)$ having a voltage, and a node $n3(i)$ having a voltage, for each $i=0, 1, 2, \ldots, N$; wherein the voltage of the node n2(0) is the analog supply voltage, and the voltage of the node n3(N) is at a ground potential; wherein the node $n3(i)$ is connected to the node $n2(i+1)$ for each $i=0, 1, \ldots, N-1$; and
the die D(i) to sample the master clock signal based on a phase P(i) of the master clock signal to provide an internal clock signal c(i), wherein the phase P(i) is determined by the ratio of a numerator and a denominator, wherein the numerator is the difference between the analog supply voltage and the voltage of the node $n2(i)$, and the denominator is the difference between the voltage of the node $n2(i)$ and the voltage of the node $n3(i)$ for each $i=0, 1, \ldots, N$.

7. The system as set forth in claim 6, wherein the die D(i) comprises a resistor R(i) having a first terminal connected to the node $n2(i)$ and a second terminal connected to the node $n3(i)$ for each $i=0, 1, \ldots, N$.

8. The system as set forth in claim 6, wherein
the die D(i) comprises a pulse width modulation generator G(i) to provide a pulse width modulation signal PWM(i) clocked by the internal clock signal for each $i=1, 2, \ldots, N$; and
the die D(i) comprises a high-side power transistor TH(i) and a low-side power transistor TL(i) coupled to the pulse width modulation generator G(i) to switch on and off in response to the pulse width modulation signal PWM(i), so that the high-side power transistor TH(i) is on only if the pulse width modulation signal PWM(i) is in a first logical state, and the low-side power transistor TL(i) is on only if the pulse width modulation signal PWM(i) is in a second logical state complementary to the first logical state, such that both the high-side power transistor TH(i) and low-side power transistor TL(i) are not simultaneously on, for each $i=1, 2, \ldots, N$.

9. The system as set forth in claim 8, further comprising:
a set of inductors $\{L(i), i=0, 1, 2, \ldots, N\}$, where the TL(i) is coupled to the high-side power transistor TH(i) and to the low-side transistor TL(i) for each $i=1, 2, \ldots, N$.

* * * * *